(12) United States Patent
Tatem et al.

(10) Patent No.: US 9,351,414 B1
(45) Date of Patent: May 24, 2016

(54) TELEVISION DISTRIBUTION COMPONENT ENCLOSURE

(71) Applicant: The DIRECTV Group, Inc., El Segundo, CA (US)

(72) Inventors: Richard B. Tatem, Middletown, MD (US); Sayedalireza Pezeshki, Chevy Chase, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 65 days.

(21) Appl. No.: 14/489,776

(22) Filed: Sep. 18, 2014

(51) Int. Cl.
*H05K 5/03* (2006.01)
*H05K 5/02* (2006.01)

(52) U.S. Cl.
CPC ............ *H05K 5/0247* (2013.01); *H05K 5/0213* (2013.01); *H05K 5/0217* (2013.01); *H05K 5/03* (2013.01)

(58) Field of Classification Search
USPC ................................................ 174/50, 66, 58
See application file for complete search history.

(56) References Cited

U.S. PATENT DOCUMENTS

| | | | | |
|---|---|---|---|---|
| 3,965,287 A * | 6/1976 | Mueller | .................. | H05K 5/03 174/535 |
| 6,788,786 B1 * | 9/2004 | Kessler | ................ | H05K 5/0247 379/413.04 |
| 7,709,735 B2 * | 5/2010 | Vigorito | ................. | H02G 3/081 174/53 |

* cited by examiner

*Primary Examiner* — Dhirubhai R Patel
(74) *Attorney, Agent, or Firm* — Harness, Dickey & Pierce, P.L.C.

(57) ABSTRACT

An enclosure for a television distribution component and method for assembling the same includes a mounting plate, a plurality of extensions extending from the mounting plate and a housing receiving the electrical component. The housing has a plurality of openings aligned with the extensions. The housing having a cover wall generally parallel to the mounting plate and a plurality of side walls, said cover wall includes a first plurality of openings aligned with the plurality of extensions, a first side wall of the plurality of side walls includes a plurality of openings for electrically connecting to the electrical component.

22 Claims, 19 Drawing Sheets

TELEVISION DISTRIBUTION COMPONENT ENCLOSURE

CROSS REFERENCE

This Application is related to U.S. application Ser. No. 29/502,633 filed concurrently herewith, the disclosure of which is incorporated herein by reference.

TECHNICAL FIELD

The present disclosure relates generally to satellite television receiving device, and, more specifically, to a bracket for mounting the devices on or near a display or television.

BACKGROUND

The statements in this section merely provide background information related to the present disclosure and may not constitute prior art.

To facilitate satellite broadcast service for a residential subscriber, a satellite service provider installs one or more "satellite dish" antennas at the subscriber's residence. The satellite dish is positioned to provide an unobstructed line-of-sight (LOS) with the satellite service provider's satellite(s) for signal reception. For rural or suburban single-family residences, the satellite dish will commonly be placed on the roof, attached to an exterior wall with appropriate (e.g., southern) exposure, or mounted on a pole in the yard, as long as line of sight with the satellite is not obstructed by trees, mountains or other structures.

For potential subscribers in more urban, higher-density housing environments, such as "multi-dwelling units" (MDU) in which individual housing units for residents or tenants are contained within one building or several buildings within one complex (e.g., apartments, condominiums, office suites, commercial and hotels), the provision of individual satellite dishes to each subscriber may be impractical or even prohibited. Not all residents of multi-dwelling units have an exterior wall or balcony with appropriate exposure, and those that do may be blocked by adjacent structures. Additionally, building codes and community rules (e.g., condominium association rules) may restrict the use of satellite dishes.

To address these issues, satellite service providers may install local content distribution systems within hotels and large multi-dwelling units to service multiple units/subscribers from a single satellite dish resource. A common dish may be used for multiple units/subscribers. Various electrical components are used to distribute the signals to the individual units/subscribers. Reducing the time and reducing the number of service personnel used to installer service an item is desirable.

SUMMARY

The present disclosure provides an enclosure for mounting a television distribution component that is easy to initially mount and that allows service personnel easy access for making upgrades or servicing. The present example is particularly suitable for multiple-dwelling units (MDU's), but may also be used for other types of residential or commercial applications.

In one aspect of the disclosure, an enclosure for an electrical component comprises a mounting plate, a plurality of extensions extending from the mounting plate and a housing receiving the electrical component. The housing has a plurality of openings aligned with the extensions. The housing having a cover wall generally parallel to the mounting plate and a plurality of side walls, said cover wall comprising a first plurality of openings aligned with the plurality of extensions, a first side wall of the plurality of side walls comprising a plurality of openings for electrically connecting to the electrical component.

In another aspect of the disclosure, a method comprises, in a first position of a housing, aligning a first extension, a second extension, a third extension and a fourth extension of a mounting plate with a respective first opening, a second opening, a third opening and a fourth opening in a cover wall of the housing. The method further comprises, in a second position, aligning the first extension with the second opening, the second extension with the first opening, the third extension with a fifth opening of the cover wall and the fourth extension with a sixth opening of the cover wall.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
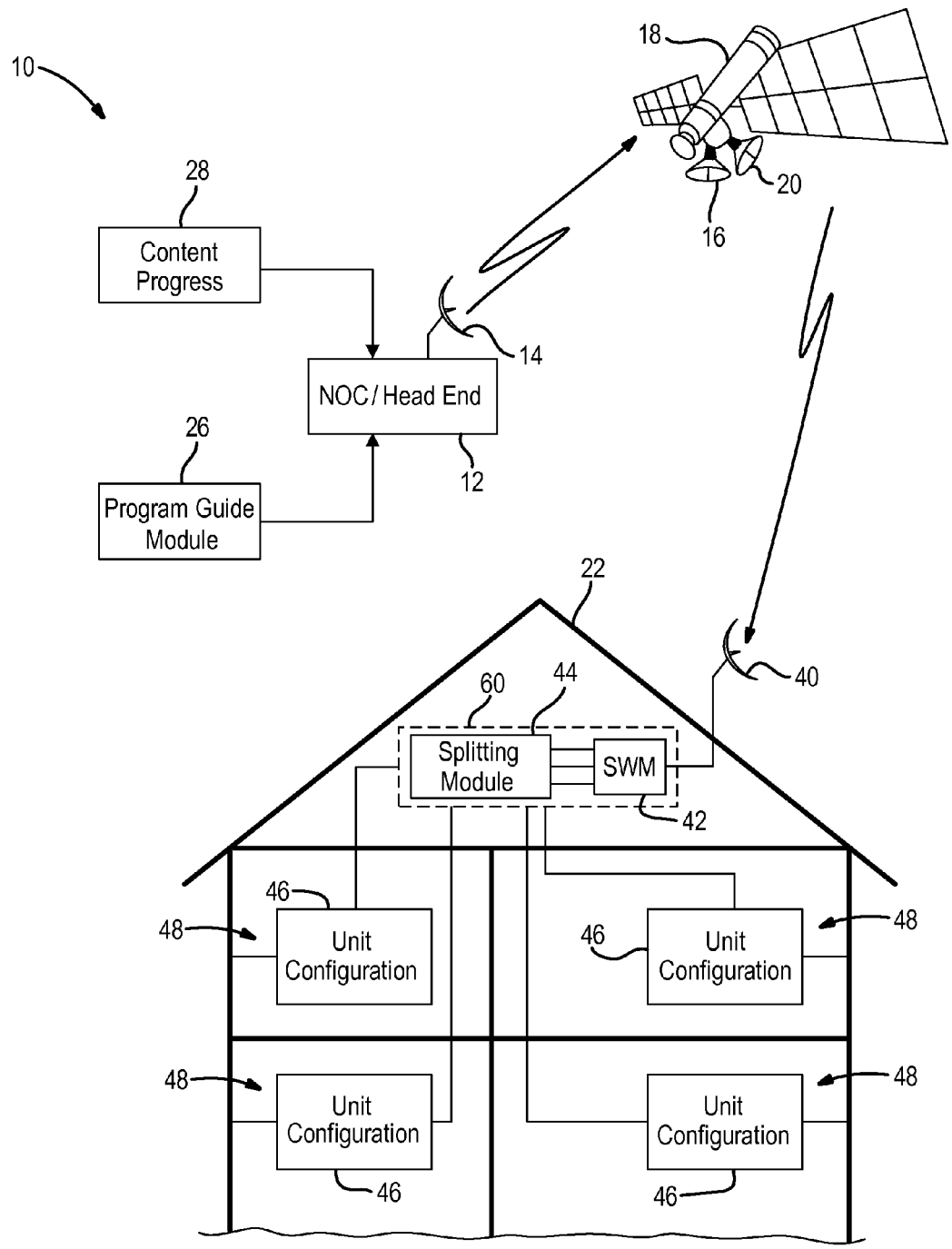
FIG. 1 is a high level block diagrammatic view of a content distribution such as a satellite television broadcasting system.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

Referring now to FIG. 1, a satellite television broadcasting system 10 is illustrated. The satellite television broadcasting system 10 includes an operational headend or network operations center (NOC) 12 that generates wireless uplink signals through a transmitting antenna 14 which are received by a receiving antenna 16 of a satellite 18. The wireless signals, for example, may be digital and in a first format used for satellite communications. A transmitting antenna 20 generates wireless downlink signals directed to various receiving systems including stationary systems such as those in a building 22 or property with multiple buildings. The building 22 may be a multiple dwelling unit (MDU) with individual unit configurations.

The wireless signals may have various types of data associated with them including various channel information such as a channel or program guide, metadata, location information and the like. The guide data may be received from the network operations center 12 or external headend. The wireless signals may also have various video and audio signals associated therewith.

The program guide data may be received from a program guide module 26. The program guide module 26 may communicate various objects to the network operations center 12. Various types of data may be communicated about the programming and grid guide including the channel number, a network identifier, program data such as a start and end time of airing, title, numerical identifier, content data such as actors, descriptions, ratings and the like. Program guide data may include the relative positions of the data, the line structures for forming the grid for the program guide and the like.

A content provider 28 may provide content to the network operations center 12. The content provider 28 may include various television networks that provide programming and content for a particular channel as well as on-demand and pay-per-view providers that provide content for communication at particular times over channels specified at the network operations center 12.

Building 22 includes a receiving antenna (e.g., satellite dish) 40 that receives the wireless signals from the satellite 18. Although only one antenna 40 is illustrated, more antennas may be provided.

The antenna or plurality of antennas 40 are in communication with a single-wire multi-switch (SWM) module 42. As will be described below, more than one single-wire multi-switch may be included within a system. The single-wire multi-switch module 42 is used to multiplex signals on one or more outputs. In some examples, the multiplexed output signals may have frequencies designated for use by particular user receiving device tuners within building 22.

A splitting module 44 is in communication with the single-wire multi-switch module 42. The splitting module 44 may split the channel signals for distribution to various unit configurations 46. Each unit configuration 46 corresponds to a user receiving device configuration within each of the individual units 48 within the building 22. The splitting module 44 and unit configuration 46 are described further below. By way of example, four individual units 48 are illustrated, each having a respective unit configuration 46.

An enclosure 60 may be used to enclose various television distribution components. Also, various connectors or openings for connecting or receiving wires for electronically connecting the antennas to the electrical components and for electrically connecting the electrical components to the unit configurations may be provided at the enclosure 60. The enclosure 60 may be mounted in various locations on the building 22. Details of the enclosure 60 are set forth below.

Figure 2:
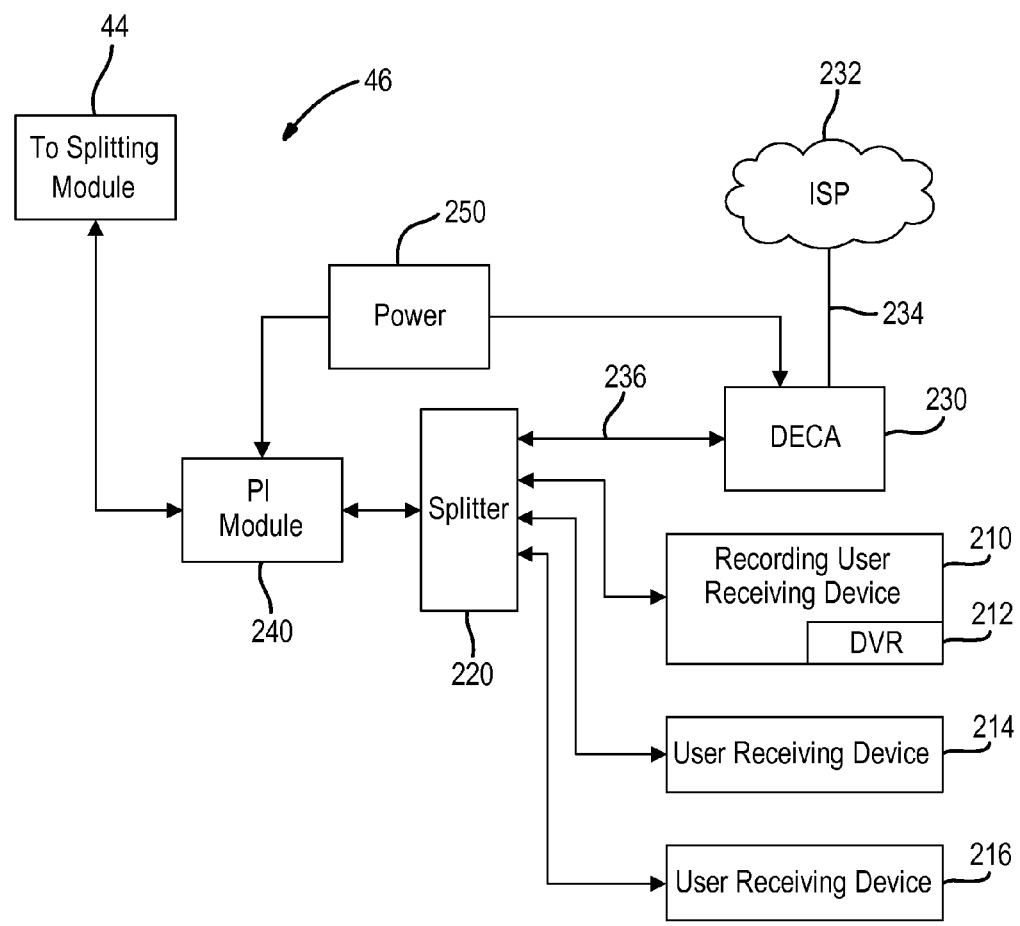
FIG. 2 is a block diagrammatic view of the unit configuration of FIG. 1.

Referring now to FIG. 2, one example for a unit configuration 46 is set forth. As will be described further below, various numbers of user receiving devices may be used. In this example, a first user receiving device is a recording user receiver device 210. A digital video recorder is provided as an example of a memory used for recording content. The digital video recorder 212 may comprise a hard drive or other types of chip-based memory such as FLASH memory. The user receiving device 210 may be used for receiving satellite signals or terrestrial over the air signals. Further, the user receiving device 210 may be used for receiving cable television signals. Of course, it should be noted that various numbers of recording user receiving devices 210 and user receiving devices 214, 216 may be used in a particular configuration. Each of the recording user devices 210 and the user receiving devices 214, 216 are in communication with a splitter 220. The splitter 220 ultimately receives signals from the splitting module 44.

A DIRECTV® Ethernet Coaxial Adapter (DECA) 230 may be in communication with an internet service provider 232 and the splitter 220. Between the ISP 232 and DECA a category 5 cable 234 may be used. Of course, often suitable IP cables may be used. The DECA 230 is used to convert the internet service provider signals into a coaxial format for communication to the splitter 220 through a coaxial cable 236. The coaxial cable may be RG6 or RG11 depending on the distance. Longer distances may require RG11. The splitter 220 may distribute the internet signals to the recording user receiving device 210 and the user receiving devices 214, 216. Likewise, signals from the recording user receiving device 210 and the user receiving devices 214, 216 may be communicated to the splitter 220 and ultimately to the internet service provider 232 through the DECA 230.

A power injection (PI) module 240 may be used to inject power onto the cable from the splitting module 44. A relatively low power such as 29 watts may be provided to the splitting module 44. Both channel signals and power may thus occupy the same cable.

Both the DECA 230 and the PI module 240 require power from a power source 250. Although not illustrated, the recording user receiving device 210, the user receiving device 214 and the user receiving device 216 all require power.

The cable connections between the splitter 228 and the user receiving devices 210, 214, 216 and the splitter 220 and the splitting module 44 may all be coaxial cable.

Figure 3:
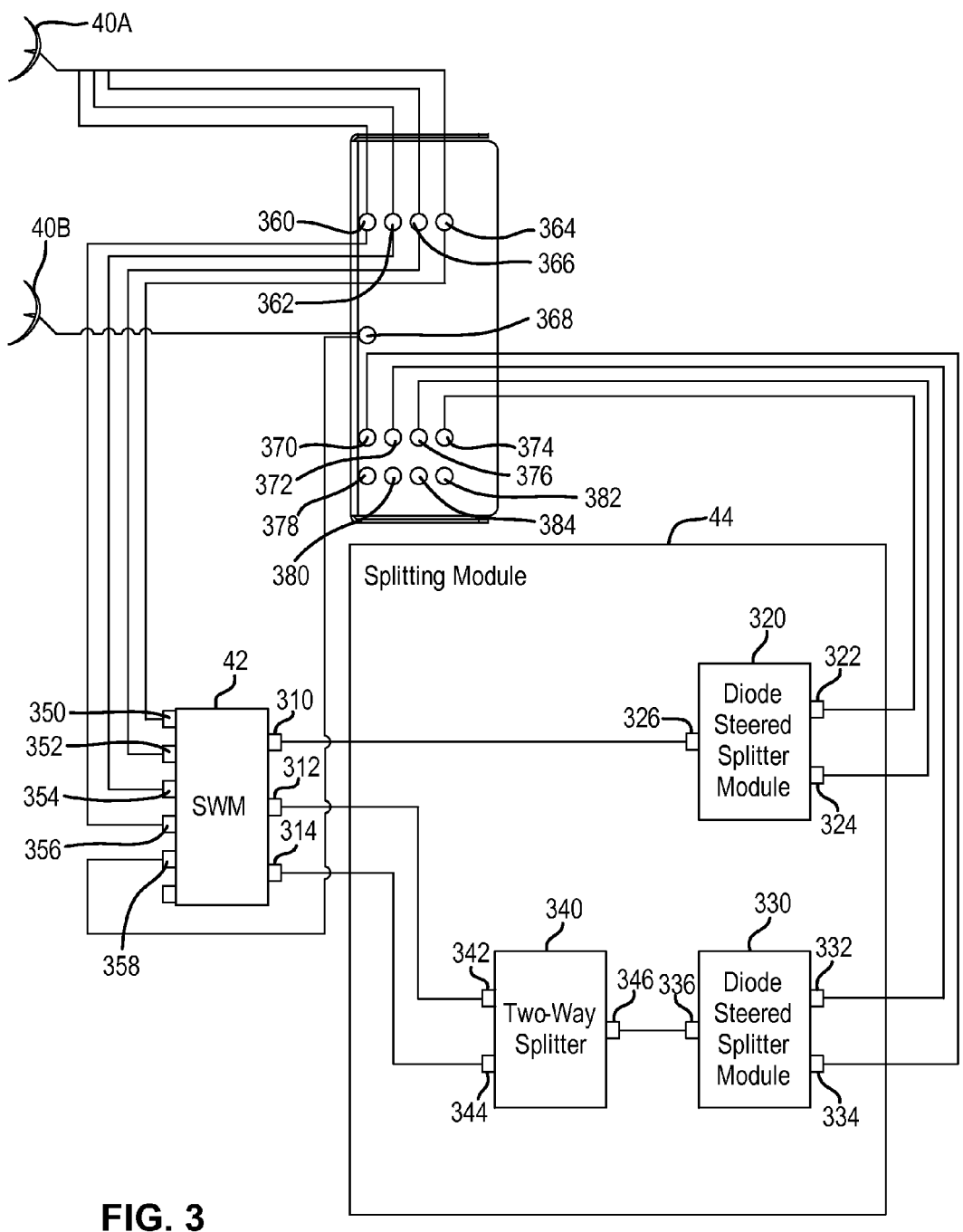
FIG. 3 is a block diagrammatic view of a first example of a splitting module according to FIG. 1.

Referring now to the FIG. 3, a first example of a splitting module 44 is set forth relative to a side wall 308 of the enclosure. The single-wire multi-switch module 42 includes a first port 310 that is capable of transmitting multiplexed channel signals therethrough. The first port 310 is also capable of receiving input power to power the single-wire multi-switch module 42. Ultimately the power into port 310 may originate from one PI module 240 from one unit configuration 46 as is illustrated in FIG. 2.

The second port 312 of the single-wire multi-switch module 42 is used for receiving power. In this example the second port 312 is a dedicated power input port.

The single-wire multi-switch module 42 may also include a third port 314. The third port 314 is a dedicated channel output port. A plurality of channels may be multiplexed onto the same wire extending from the output port 314.

The splitting module 44 may include a first diode steered splitter module 320. The first diode steered splitter module 320 may include a fourth port 322 that is in communication with a first multi-dwelling unit. In particular, the fourth port 322 may be in communication with the PI module 240 located in the first multi-dwelling unit illustrated in FIG. 2.

The diode steered splitter module 320 may also include a fifth port 324 that is in communication with a second multi-dwelling unit. In particular, the fifth port 324 may be in communication with a second PI module 240 located in a second multi-dwelling unit.

The diode steered splitter module 320 also includes a fourth port 326 that is in communication with the first port 310 of the single-wire multi-switch 42. Port 326 may receive multiplexed channel signals from the first port 310. The diode steered splitter module 320 may communicate the multiplexed channel signals from the sixth port 326 to the fourth and fifth ports 322, 324. Likewise, power from the PI modules 240 located in different multi-dwelling units may communicate power to the sixth port 326. A description of the power communication is described below. Generally, the port 322 or 324 having the highest voltage provides the output through the sixth port 326.

A second diode steered splitter module 330 is configured in similar manner to the diode steered splitter module 320 described above. In this example a seventh port 332 and an eighth port 334 are in communication with PI modules 240 located in a third and fourth multi-dwelling unit. A ninth port 336 is in communication with a two-way splitter 340. In particular, a tenth port 346 of the two-way splitter is in communication with the ninth port 336. An eleventh port 342 is in communication with the second port 312 of the single-wire multi-switch. A twelfth port 344 is in communication with the third port 314 of the single-wire multi-switch 42. The two-way splitter 340 splits the signal from the tenth port 346. In reverse, the two-way splitter 340 combines the signals from the eleventh port 342 and the twelfth port 344 at the tenth port 346.

In this manner, when a power signal is selected at the diode steered splitter module 330, the eleventh port 342 provides power to the dedicated power port 312. In the reverse direction multiplexed channel signals from the third port 314 are combined with the power signal from the eleventh port 342.

The enclosure 60 described above may include the single-wire multi-switch module 42 and the splitting module 44. The single-wire multi-switch module 42 may include a plurality of inputs 350, 352, 354, 356 and 358. The inputs 350, 358 may be connected to the antennas 40A, 40B. Antennas 40A, 40B are shown rather than a single antenna 40 as was illustrated in FIG. 1. Antennas 40A and 40B are shown to illustrate that more than one antenna may be used to communicate with different satellites. In a typical DIRECTV system, one antenna 40A may be used to communicate with five satellites. However, the additional antenna 40B may be used to communicate international content from a separate satellite. Connectors 360, 362, 364, 366 and 368 may interconnect the satellite antennas with the SWM module 42.

The outputs of the diode steered splitter modules 320, 330, 320', 330' are coupled to the outputs 370, 372, 374 and 376. Other outputs used in the figure below are 378, 380, 382 and 384. The outputs 370-384 may represent openings in a wall or connectors. The connectors may be integrated with the ports 322-334 and extend through the openings. The outputs 370-384 are outputs to individual customer premises.

Figure 4:
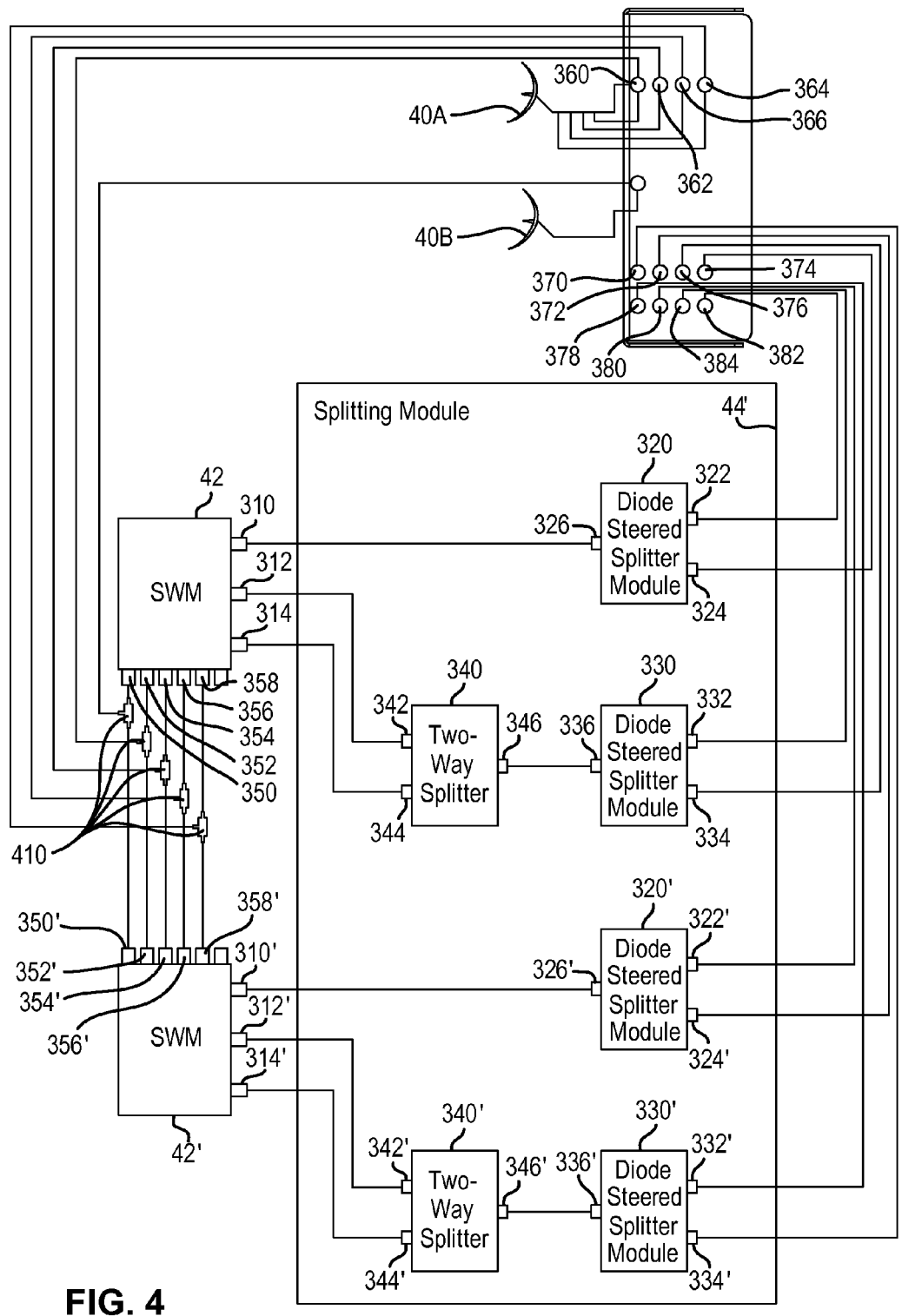
FIG. 4 is a block diagrammatic view of a second embodiment of the splitting module of FIG. 1.

Referring now to FIG. 4, a splitting module 44' suitable for a larger multi-dwelling unit as set forth. In this example the splitting module configuration is duplicated twice so that eight outputs are formed. The same reference numbers are used for the same components as those of FIG. 3. The lower half of the figure is labeled with primed reference numerals. In addition to the above, splitters 410 are used to split the satellite signals received through the antennas 40A, 40B. The splitters 410 split each signal and are used for joining a first group of ports 350-358 on the first SWM module 42 with the second group of ports 350'-358' on respective SWM modules 42'.

By joining the SWM modules 42 and 42' more unit configurations or receiving devices can be added to the system. By joining SWM modules, an antenna connection can be shared therebetween. An initial system capable of a limited number of unit configurations can be deployed to keep costs low such as shown in FIG. 3. As more subscribers are added, more SWM modules may be added together in the manner illustrated in FIG. 4. More than two SWM modules may be added together when more unit configurations are required.

It should be noted that the splitter modules 410, 320 and 330 may all have integrated connectors that are received through the outputs 370-384.

Figure 5:
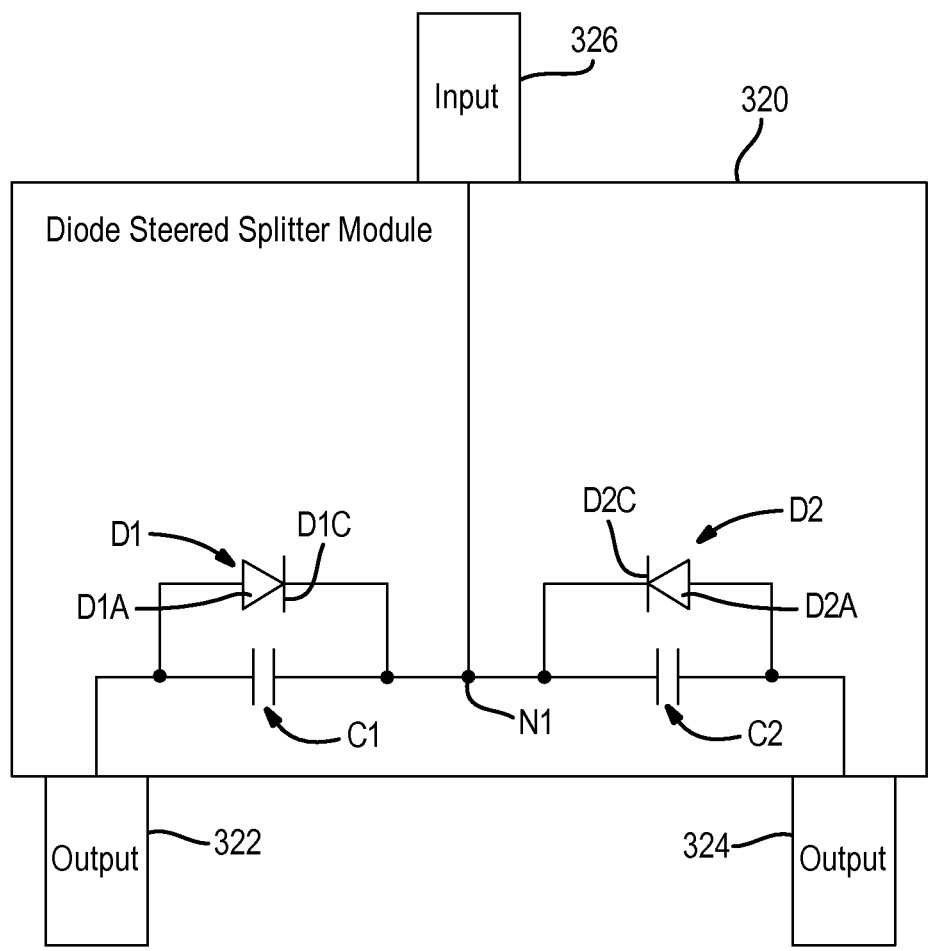
FIG. 5 is a block diagrammatic view of the steered diode splitter of FIGS. 3 and 4.

Referring now to FIG. 5, one example of a diode steered splitter module 320 is illustrated. Each of the diode steered splitters may be configured in a similar manner. In this example diode steered splitter module 320 includes the port 326 which is split into the port 322 and port 324. Internally, a common input node N1 associated with input 326 has a capacitor C1 between the node N1 and the port 322. A diode D1 having an anode D1A and a cathode D1C is in parallel with the capacitor C1. Further, a capacitor C2 is disposed between the node N1 and the port 324. A second diode D2 having a cathode D2C and an anode D2A is set forth. The anodes D2A, D1A and one end of the capacitors C1 and C2 are electronically coupled to the respective port 322, 324. Ports 322, 324 act as output nodes. Ports 322, 324 may represent connectors that are disposed through the outputs 370-384. The connectors may be threaded. The cathodes are electrically coupled to the node N1. In this manner, the highest voltage across the diodes allows the diode to conduct toward the input port 326. This in turn powers the SWM module.

Figure 6:
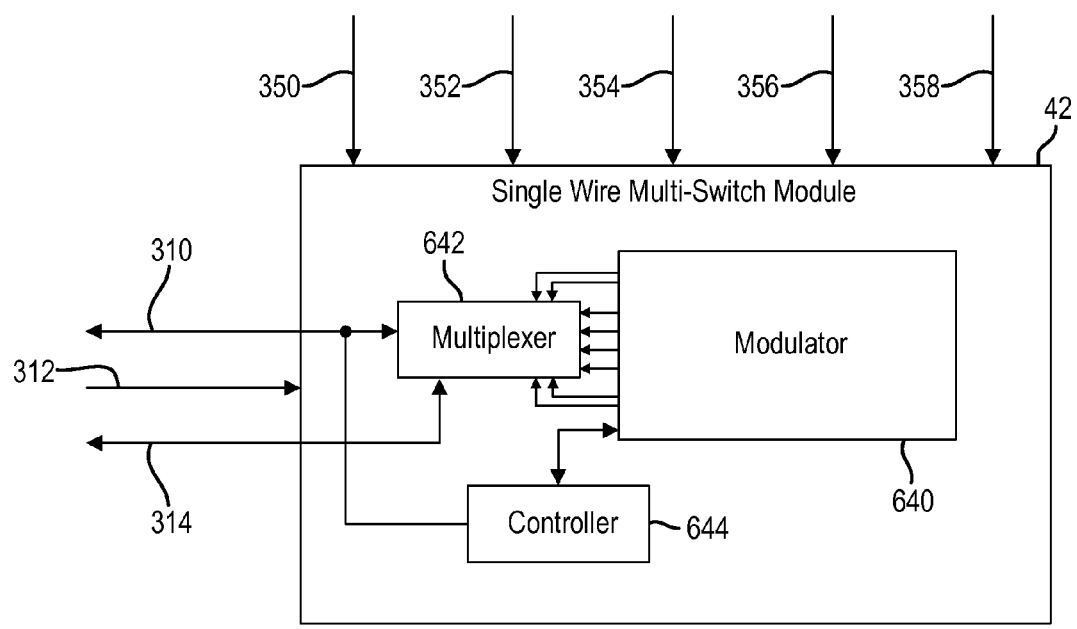
FIG. 6 is a block diagrammatic view of the single wire multi-switch module illustrated in FIG. 1.

Referring now to FIG. 6, a single-wire multi-switch module of FIGS. 3 and 4 (switch module) 42 is illustrated in further detail. In this example, five inputs 350, 352, 354, 356 and 358 are illustrated. The single-wire multi-switch module 42 may also include output ports 310 and 314, as described above, that is used for generating an output that is communicated to the various units.

The inputs 350-358 may receive external channel signals having various frequencies and or polarizations corresponding to the transponders of the satellite. The inputs include frequencies that correspond to program guide data.

The inputs 350-358 correspond to the transponders for the different orbital locations of the satellite. The single-wire multi-switch module 42 assigns a frequency for each tuner module within the user receiving devices that desire a channel signal. Thus, each of the tuner modules is assigned a different frequency band for communication. A modulator module 640 is used for providing the modulated signals. Each of the user receiving devices thus generates a request for a channel from one of the inputs 350-358. The channels are then modulated into the frequency corresponding to the tuner of the user receiving device. The frequency signals may be combined onto the outputs 310-314 using a multiplexer 642. The splitter module 44 illustrated above splits the combined signal for each tuner or user receiving device. Every tuner may receive every requested channel but only the channel (frequency) corresponding thereto is displayed. A controller 644 controls the communication and the modulator modules 640 to provide the proper signal for the user device within the unit. Various numbers of devices and/or tuners may be provided depending upon the size of the single-wire multi-switch module. Program guide data may be communicated through the inputs 350-358.

Figure 7A:
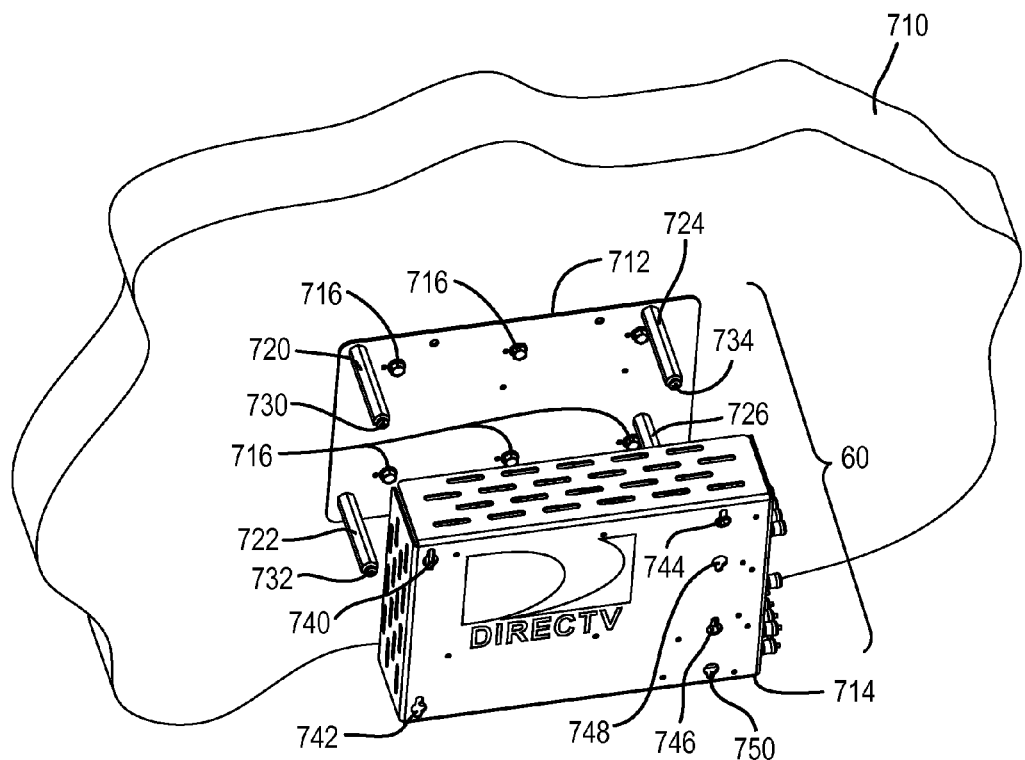
FIG. 7A is a perspective view of an enclosure mounted to a wall.

Referring now to FIG. 7A, an exploded perspective view of the enclosure 60 is illustrated relative to a wall 710 or other mounting feature. The enclosure 60, as mentioned above, may be used to house the electrical components illustrated in FIG. 3 or 4. The enclosure 60 comprises a mounting plate 712 and a housing 714 into which an electrical component or components are mounted.

A plurality of fasteners 716 are used to secure the mounting plate 712 to the wall 710. The fasteners 716 may be threaded fasteners such as screws. The fasteners 716 may be spaced to coincide with typical stud or wall spacing. The details of the mounting plate 712 and the housing 714 will be described in further detail below.

The mounting plate has extensions 720, 722, 724 and 726 extending therefrom. The extensions 720-726 are used to position the housing 714 relative to the mounting plate 712. The extensions 720-726 have fasteners 730, 732, 734 and 736 (not shown) that are used to securely mount the housing 714 to the extensions 720-726. The fasteners may be conventional flat or phillips head screws or a unique pattern to increase security.

Figure 7B:
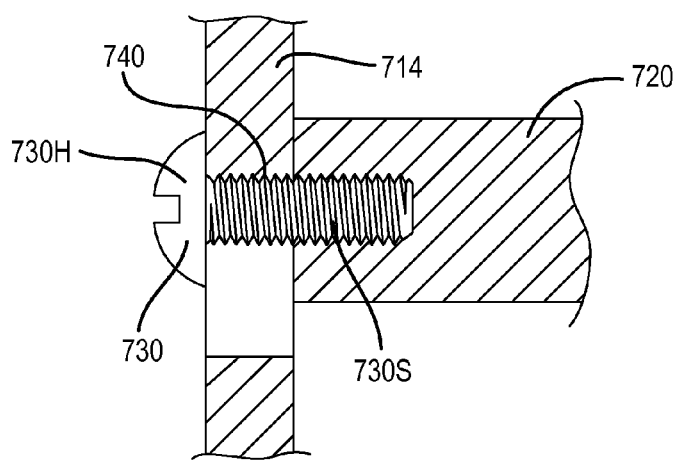
FIG. 7B is a partial view of an enclosure mounted to a wall.

The extensions 720-726 align with openings 740, 742, 744 and 746 through the housing 714. The openings 740-746 are used when the housing is in a first position as illustrated in FIG. 7. Each of the openings 740-746 have a wide portion sized to receive a head 730H of the fasteners 730-736. In the first position, the housing 714 is then moved in a downward position so that the narrow part of the opening aligns with a shaft 730S of the respective fasteners 730-736. Only one fastener 730 is shown by way of example. Other fasteners 732-736 may be configured in the same manner. The fasteners 730-736 may then be tightened so that the housing 714 is between the fasteners 730-736 and the respective extensions 720-726. This configuration is illustrated best in FIG. 7B.

As will be further described below, the openings 748, 750 are used when the housing 714 is in a second position. The opposite or inside of the housing 714 faces outward. This will be further described below. In the second position opening 742 aligns with the extension 720, opening 740 aligns with the extension 724, opening 750 aligns with extension 722 and opening 748 aligns with extension 726. The second position is formed when the housing 714 is rotated about a lateral axis. As will be described further below, threads on the fasteners 730-736 extend into threads with the respective extensions 720-726.

Figure 8:
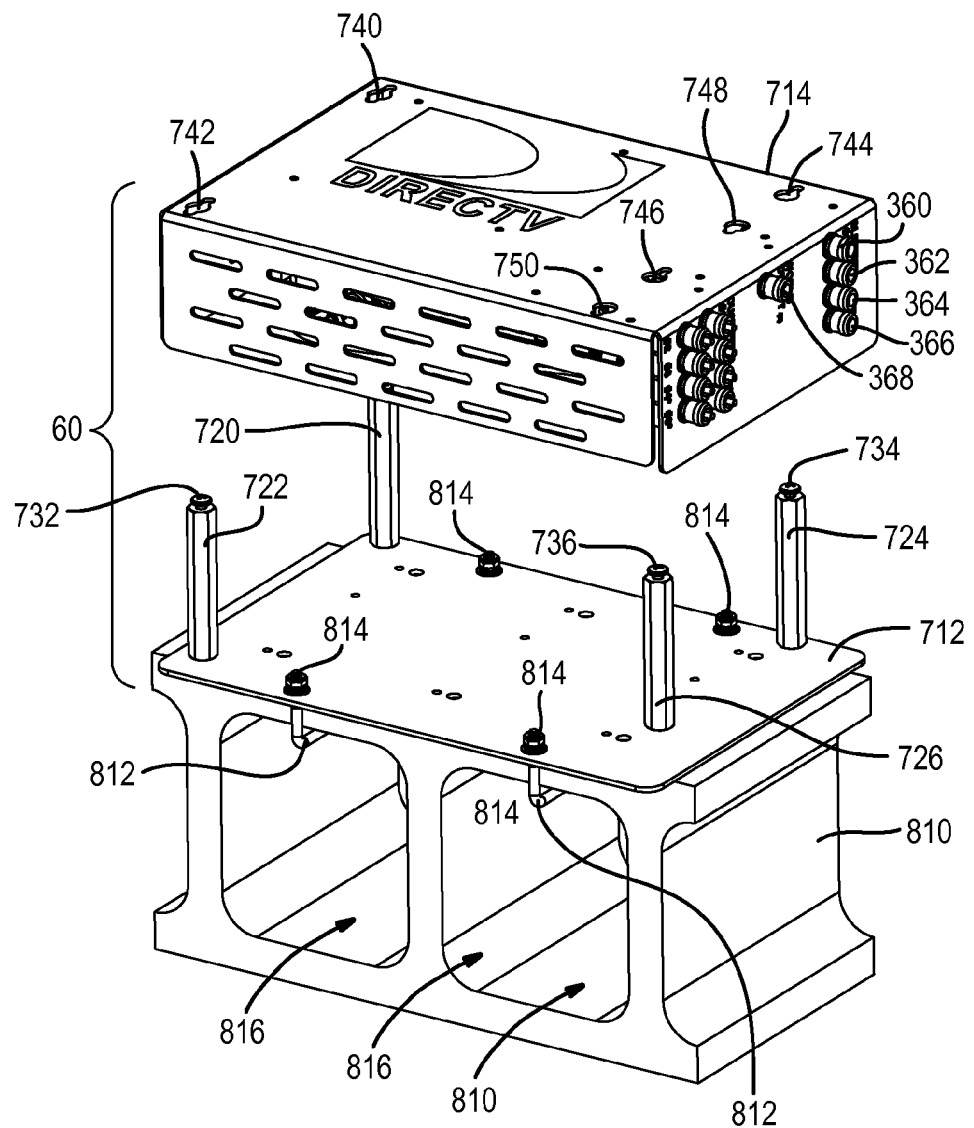
FIG. 8 is a perspective view of an enclosure mounted to a cinder block.

Referring now to FIG. 8, the enclosure 60 is illustrated mounted to a cinder block 810. The cinder block 810 is secured to the mounting plate 712 with a U-bolt 812 and nuts 814. The U-bolt 812 is sized to be received in an opening 816 of cinder block 810.

Figure 9:
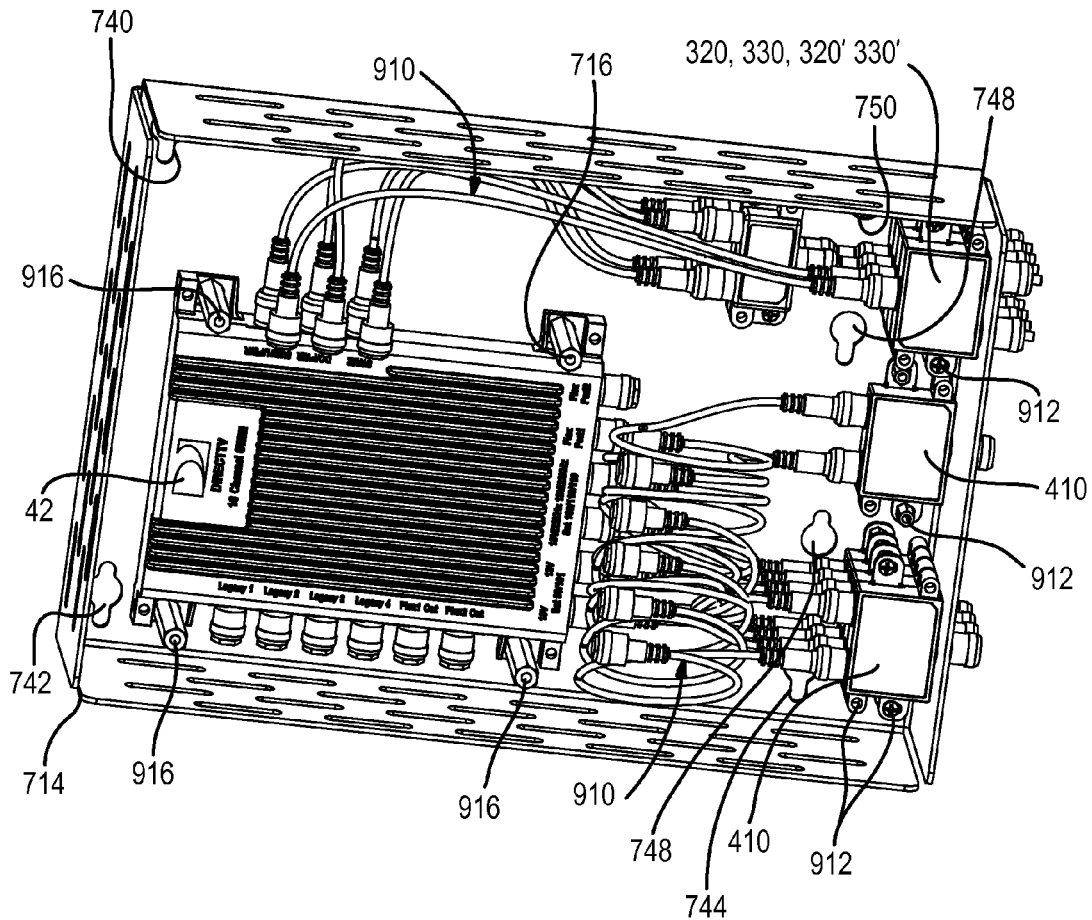
FIG. 9 is an interior view of the housing.

Referring now to FIG. 9, an interior view of the housing 714 is illustrated. The components from FIGS. 3 and 4 are labeled therein. That is, the SWM module 42 is illustrated relative to the splitters 410 and the diode steered splitter modules 320, 330, 320' and 330'. Various wires are used to interconnect the various components. The wires are generally illustrated as reference numeral 910. Various fasteners 912 are used to secure the splitter modules 410, 320, 330, 320' and 330', to the housing 714.

A plurality of extensions 916 may be used to secure the SWM module 42 to the housing 714.

Figure 10:
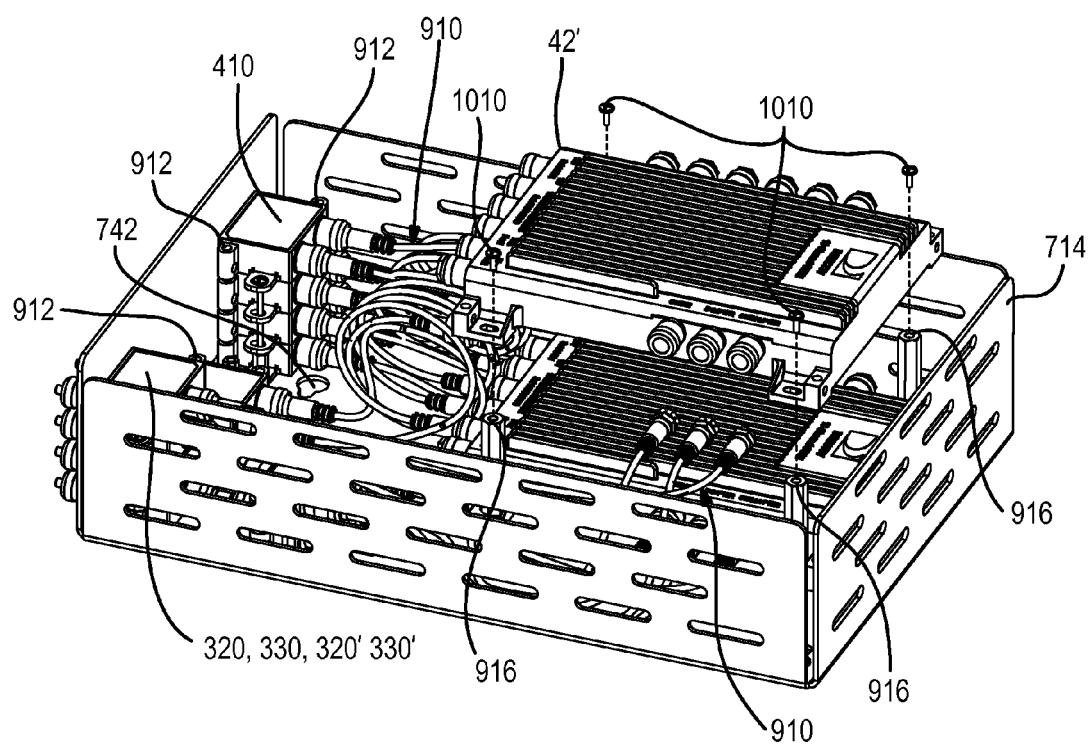
FIG. 10 is an interior view of a housing having dual SWM modules.

Referring now to FIG. 10, the housing 714 is shown with a second SWM module 42'. The SWM module 42' is physically mounted to the standoffs 916 through the use of fasteners 1010. The fasteners 1010 may be screwed.

Figure 11:
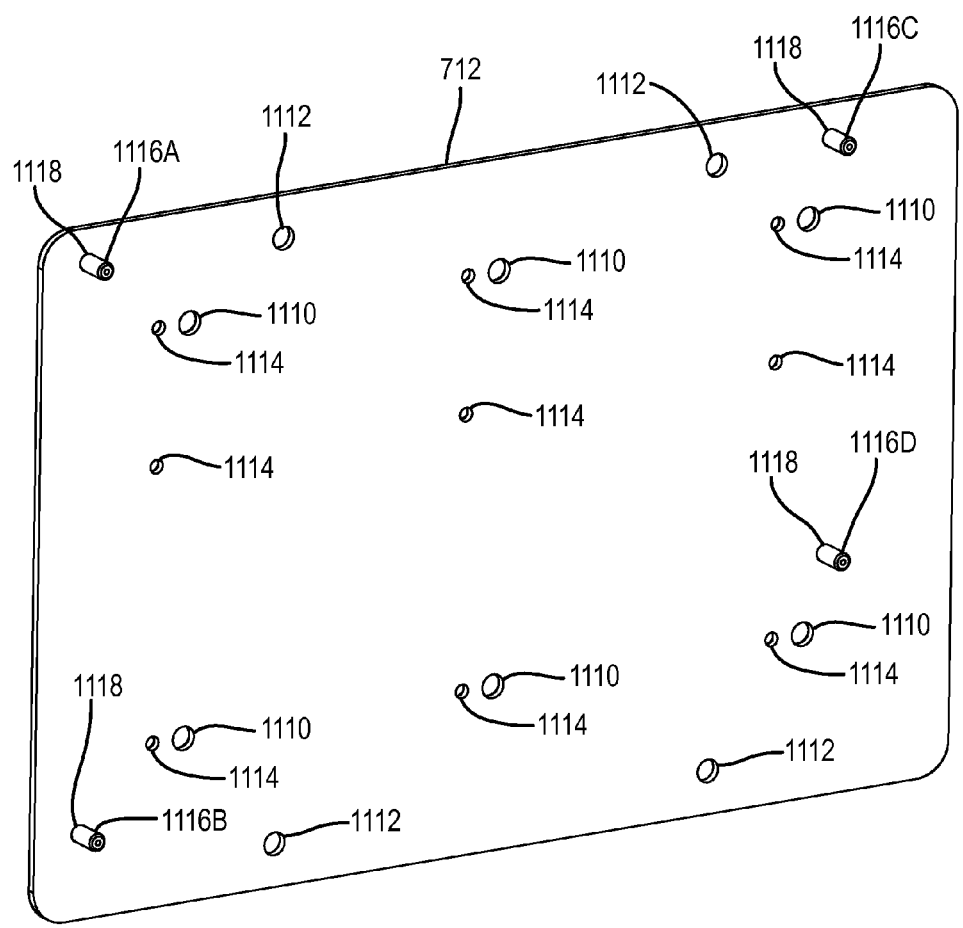
FIG. 11 is a perspective view of a mounting plate.

Referring now to FIG. 11, mounting plate 712 is illustrated in further detail. The mounting plate 712 may include a plurality of openings 1110 used for receiving the fasteners 716 illustrated in FIG. 7. As mentioned above, the openings 1110 may be spaced laterally so that the mounting plate 712 can be mounted directly to studs or other wall supports.

Openings 1112 are used to receive the U-bolts 812 illustrated in FIG. 8. As mentioned above, the U-bolts 812 secure the mounting plate 712 to a cinder block. It is common for cinder blocks to be used as weight to secure an outdoor unit to a building roof.

Another plurality of openings 1114 are used for receiving fasteners for the various splitters and other electrical components as was illustrated in FIGS. 9 and 10.

The mounting plate 712 may also have a plurality of studs 1116A-D mounted thereto. The studs 1116 may be threaded studs that are secured to the mounting plate 712. The threaded studs 1116 may be self-clinching studs that are installed by placing them in properly sized holes in the mounting plate 712 and squeezing them into place with a standard press. The squeezing action embeds a head of a stud into the mounting plate 712. One example of a suitable stud is a flush-head stud manufactured by Penn Engineering. Stud openings 1118 in FIG. 11 are partially obscured by the studs 1116.

Figure 12:
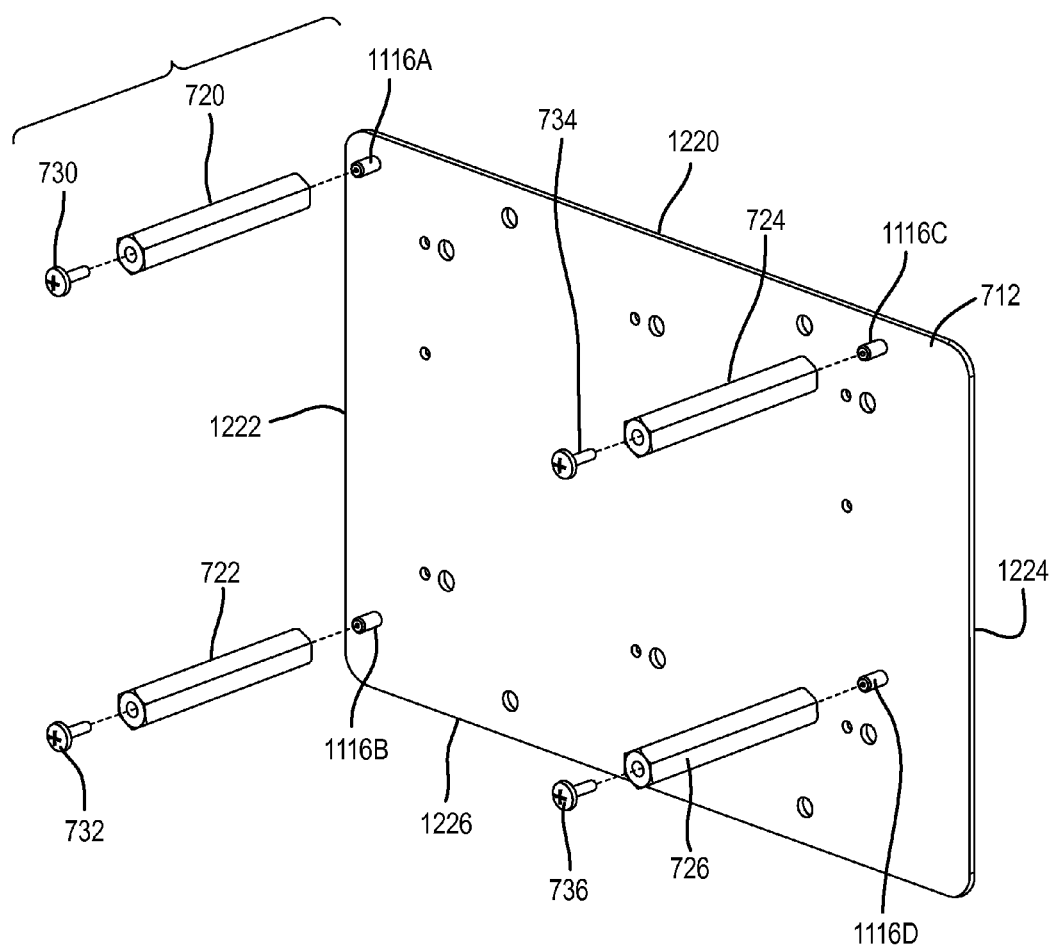
FIG. 12 is a perspective view of a mounting plate relative to a plurality of standoffs.

Referring now to FIG. 12, extensions 720, 722, 724 and 726 are illustrated relative to studs 1116A-1116D. Each extension may have a threaded opening therein for receiving threads on the studs 1116. Each extension 720-726 may also be used to receive fasteners 730-736 for securing the housing 714 to the respective extensions 720-726. The studs 1116A and 1116C may be located the same distance from a top edge 1220 of the mounting plate 712. The studs 1116A and 1116B and extension 720 and 722 may be located the same distance from the left edge 1222. The distance between the extensions 724 and 726 from a right edge 1224 may be the same. However, the distance from the left edge 1222 to the extensions 720 and 722 may be different than the distance from the right edge to the extensions 724 and 726. The distance from each of the extensions 722 and 726 from the bottom edge 1226 may also be different. The extension 726 may be further from the bottom edge 1226 than the extension 722.

Figure 13:
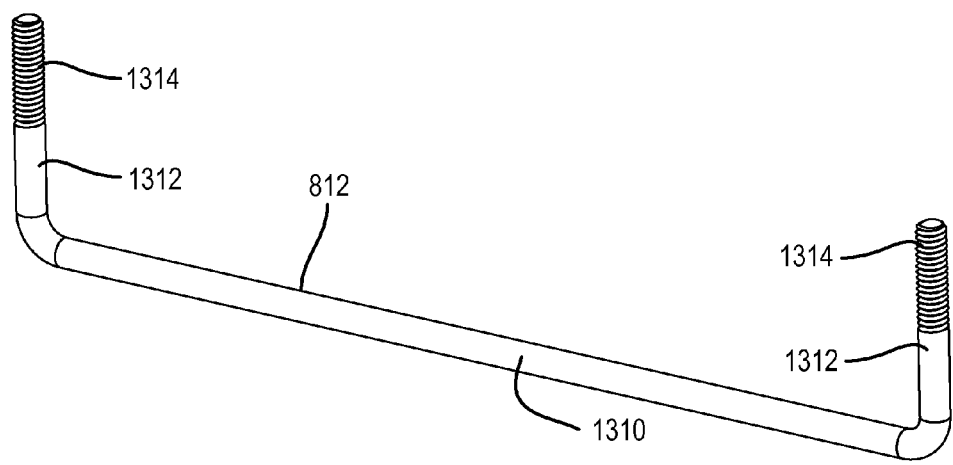
FIG. 13 is a perspective view of a U-bolt.

Referring now to FIG. 13, a U-bolt 812 is illustrated in further detail. The U-bolt 812 includes a longitudinal portion 1310 and two extensions 1312. The extensions 1312 include threads 1314. As was illustrated in FIG. 8, the U-bolts 812 may be secured with nuts 814 that cooperate with the threads 1314.

Figure 14:
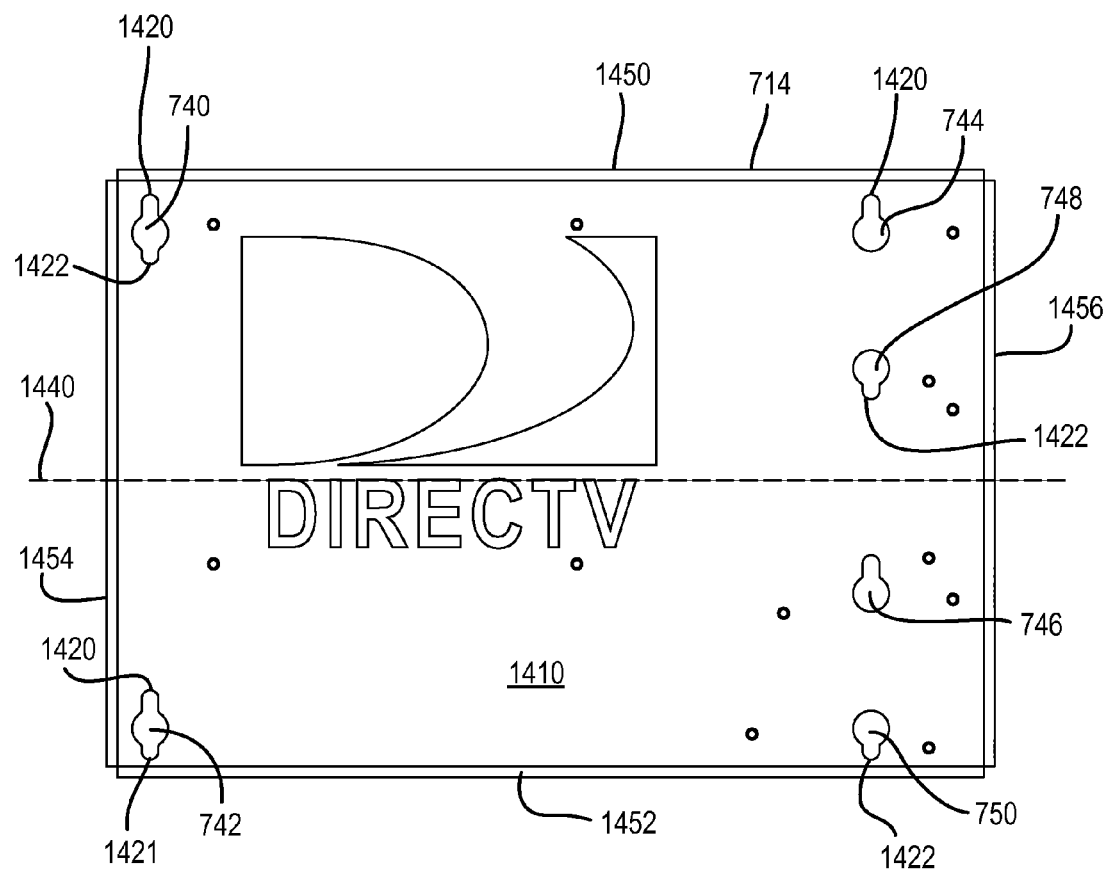
FIG. 14 is a view of a cover wall of the housing and the openings therein.

Referring now to FIG. 14, a cover wall 1410 of the housing 714 is illustrated. The housing 714 also includes the plurality of openings 740-750 as described above. Openings 740, 742, 744 and 746 correspond to the positions of the extensions 720-726 respectively illustrated in FIG. 12.

The housing 714 may also include a plurality of side walls including a top side wall 1450, a bottom side wall 1452, a left side wall 1454 and a right side wall 1456.

The openings 740 and 742 are bi-directionally elongated openings. By bi-directionally elongated, the openings 740, 742 are generally circular in the middle and have opening extensions 1420 and 1422. Extension 1420 extends toward top side wall 1450. Opening extension 1422 extends toward the bottom side wall 1452. The openings 740 and 742 are used when the housing 714 is both in a first position for normal operation and a second position for a servicing position. In the first or normal position, the opening extension 1420 receives the shaft of the fasteners 730-732. In the second position, the lower opening extension 1422 receives the shaft of the respective fastener 730-732. The openings 744-750 may be referred to a uni-directional. That is, openings 744-750 have only one extending portion. Openings 744 and 746 have opening extensions 1420 that extend toward the top side wall 1450. The extending portions receive the shaft of the fasteners 734-736 when the housing is in the first position. When the housing is in the reverse or servicing position, the openings 748 and 750 receive the fasteners 736 and 734 respectively so that the respective shafts of the fasteners 736 and 734 rest within the opening extension 1422. Thus, as mentioned above, different openings may be used for the servicing position and the regular closed position of the housing 714.

A lateral axis 1440 is illustrated in FIG. 14. For servicing, the housing 714 is rotated about the axis 1440 and the openings 740 and 742 align with extensions 722 and 720, respectively. Opening extension 1420 corresponds to extension 724 and opening 746 corresponds to extension 726. When the housing 714 is rotated into the service position, the view illustrated in FIG. 9 or 10 is made available. By rotating the housing 714, a sole service technician up on a ladder or other restricted access area may easily service the electrical components within the housing 714.

Figure 15:
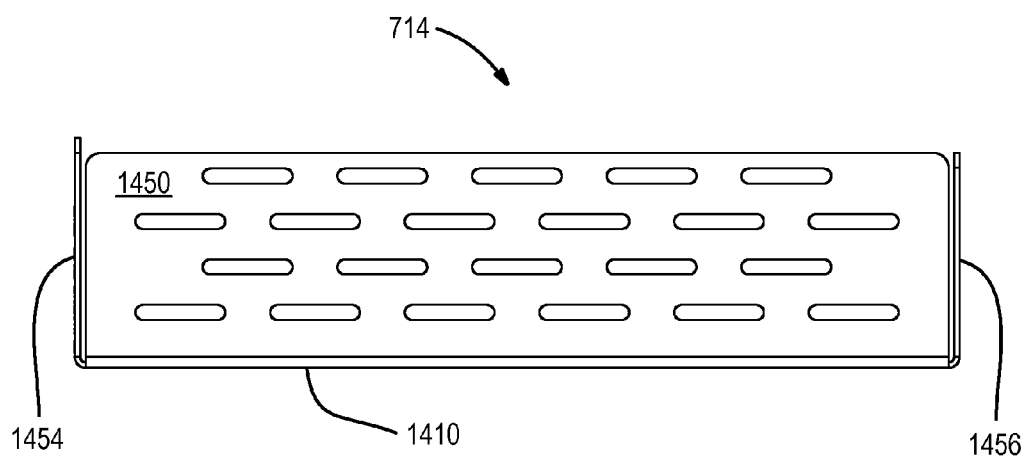
FIG. 15 is a bottom view of the housing.

Referring now to FIG. 15, a bottom view of the housing 714 is illustrated. The left side wall 1454 and right side wall 1456 are illustrated together with the top side wall 1450. The top view is similar. The side walls 1450-1456 may extend to be adjacent to the mounting plate illustrated above. This prevents animals from entering the enclosure.

Figure 16:
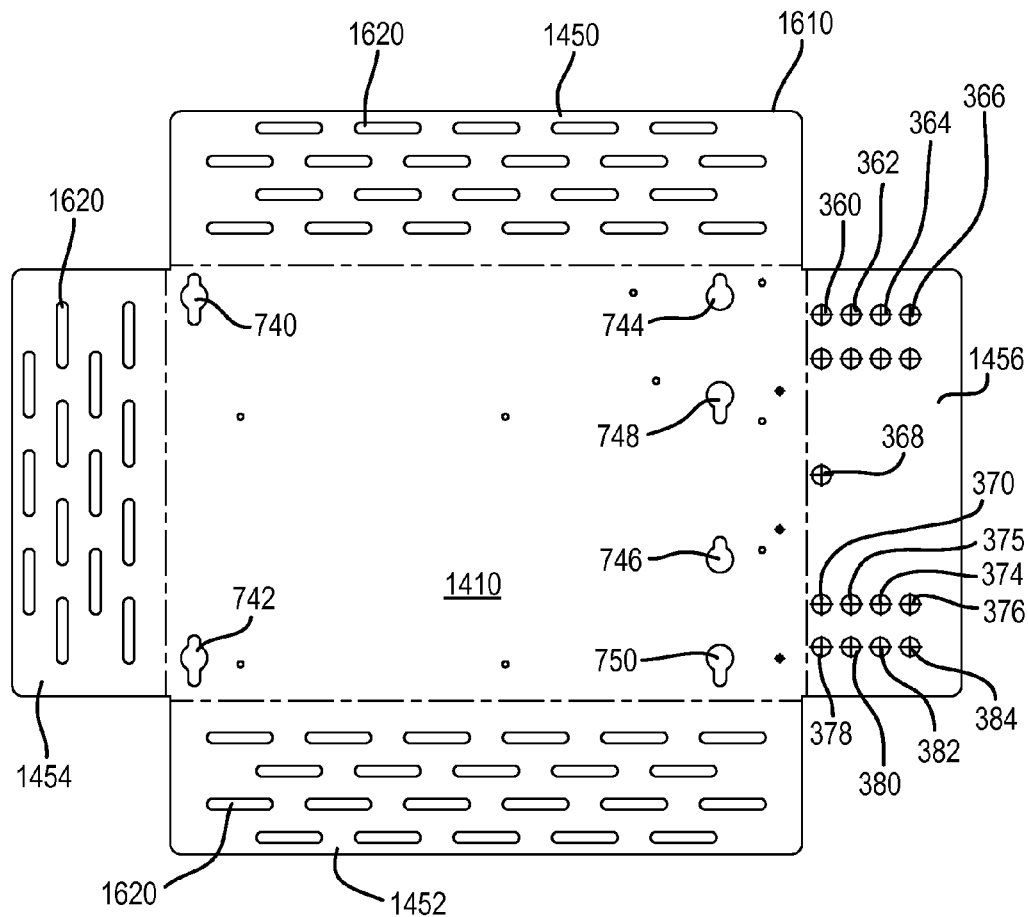
FIG. 16 is a plan view of a sheet used to form the housing.

Referring now to FIG. 16, a preform 1610 having the plurality of openings in the bottom side wall 1452, left side wall 1454 and cover wall 1410 is set forth. The side walls 1450-1456 are illustrated prior to bending the preform. The preform 1610 may be stamped or otherwise machined then bent to form the housing 714.

The top side wall 1450, the left side wall 1454 and the bottom side wall 1452 include a plurality of vent openings 1620 for ventilating the housing 714. The vent openings 1620 may be sized to restrict access to bonds. The preform 1610 may also be formed of a metal material that acts as a heat sink for the SWM modules and/or the splitter modules illustrated above. After forming the preform 1610, the side walls 1450-1456 may be bent along the dashed lines to form the housing 714.

Figure 17:
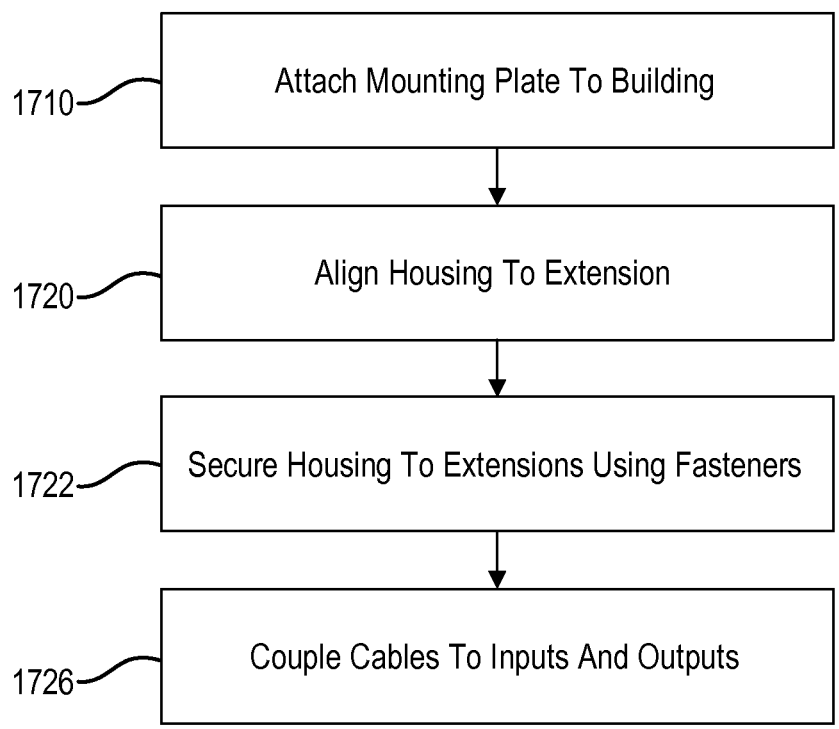
FIG. 17 is a flowchart of a method for attaching the housing to a mounting plate.

Referring now to FIG. 17, a method for securing the enclosure is set forth. In step 1710, the mounting plate is attached to a building. As mentioned above, U-bolts may be used to attach the mounting plate to cinder blocks that rest on or are secured to the building or fasteners may be used to mount the mounting plate directly to a wall or other surface. In step 1720 the housing is aligned with the extensions on the mounting plate. In step 1722 the housing is secured to the extensions using fasteners. The cover wall of the housing has openings therein that are used to receive the fasteners that couple to the extensions therein. The housing is secured between the head of the fastener and the extension. In step 1724 the cables that connect to the outdoor unit or satellite antennas and the cables that connect to the unit configurations are made.

Figure 18:
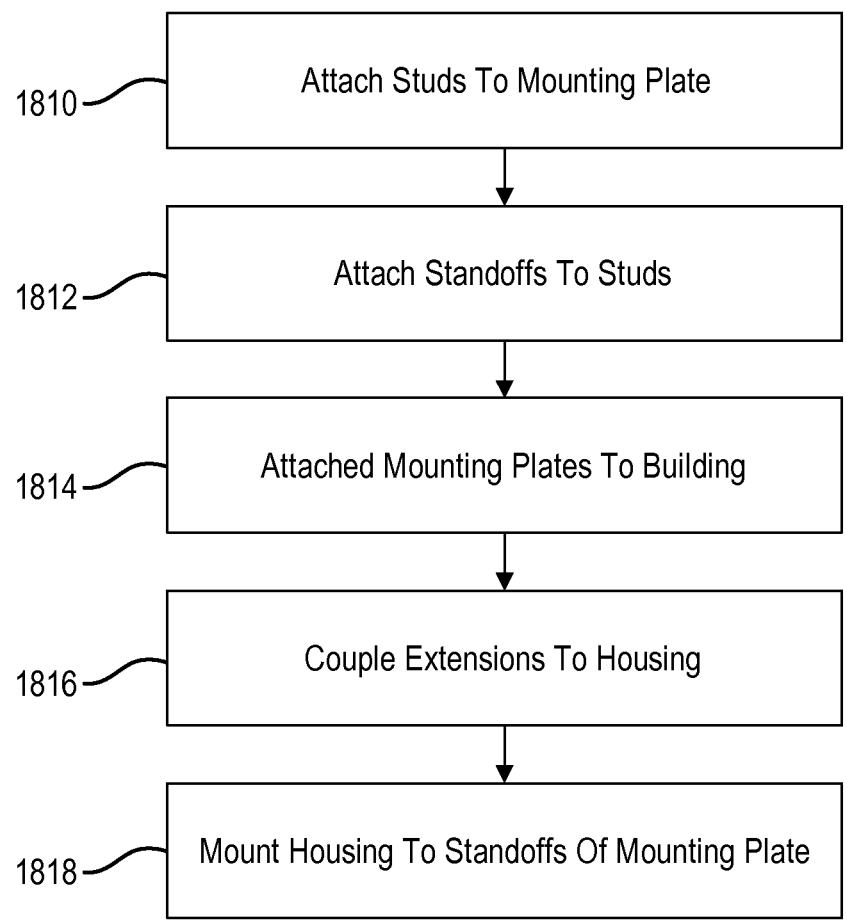
FIG. 18 is a flowchart of a method for mounting the housing.

Referring now to FIG. 18, a method for forming the mounting plate is set forth. In step 1810 studs are attached to the mounting plate. As mentioned above, the studs may be press fit into openings within the mounting plate. The studs may have exterior threads. In step 1812 the standoff may be coupled to the studs. The standoffs may have threaded holes therein to receive the threads on the studs. In step 1814 the mounting plate with the standoffs are attached to a building. Of course, the standoffs may be mounted to the mounting plate securing mounting the mounting plate to the building. In step 1816 electronics are coupled within the housing. In step 1818 the housing is coupled to the standoffs of the mounting plate. As mentioned above, the standoffs may use fasteners that are tightened to secure the cover wall against the extensions. The head of the fasteners force the cover wall toward an outward end of the extensions.

Figure 19:
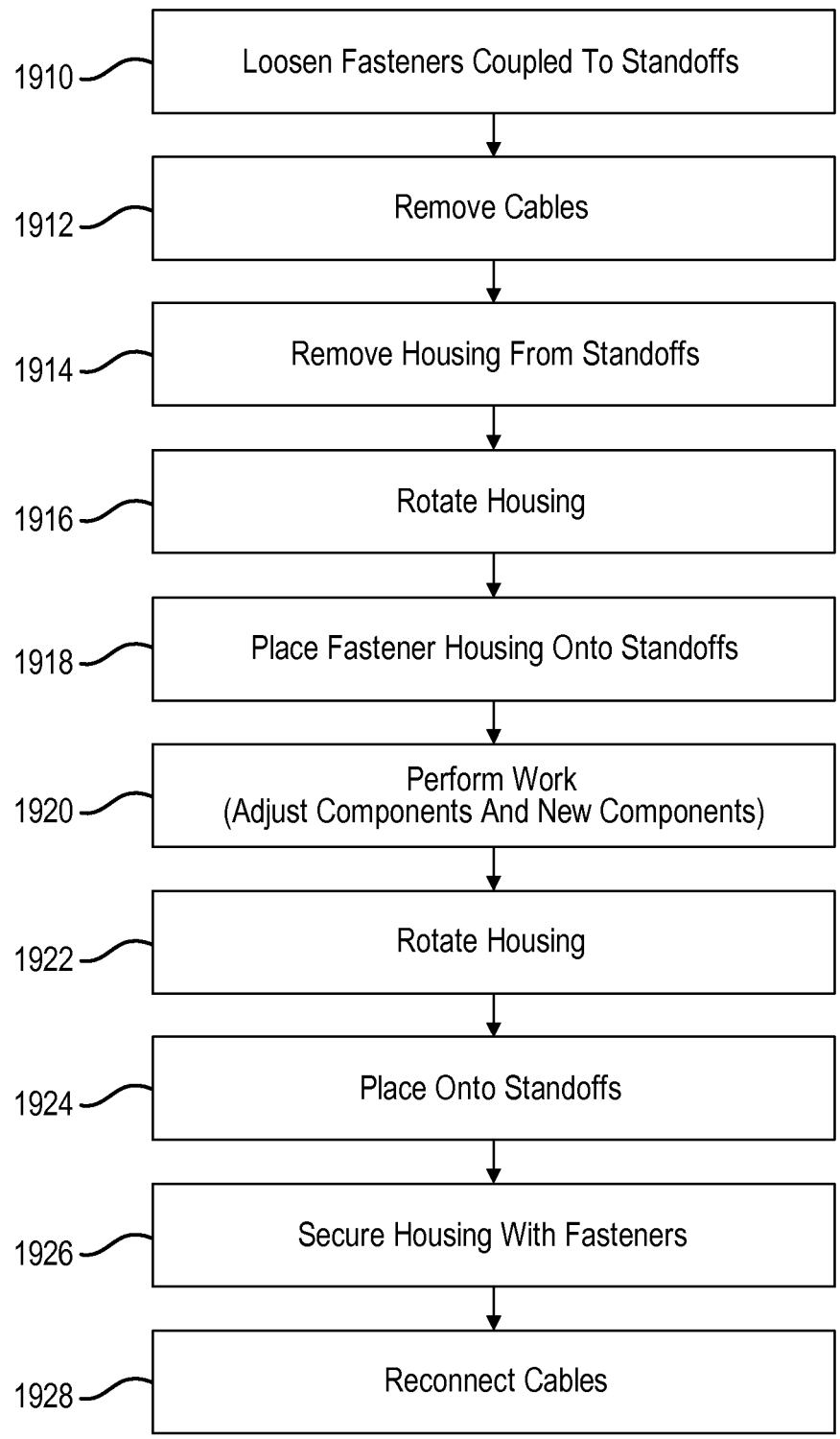
FIG. 19 is a flowchart of a method for servicing the electronics within the housing.

Referring now to FIG. 19, a method for servicing the electrical components within the enclosure 60 is set forth.

In step 1910 the fasteners coupling the cover wall to the standoffs are loosened. In step 1910 the cables attached to or through the right side wall are also loosened. In step 1914, the housing is removed from the standoffs. It should be noted that the irregular shape of the openings allows the housing to be removed without having to remove the fasteners fully. The openings are aligned with the fastener head and removed in a lateral or outward direction (parallel to the direction of the extensions away from the mounting plate). In step 1916 the housing may be rotated about a lateral access 1440 as was illustrated in FIG. 14. In step 1918 the openings of the rotated housing are aligned with the standoffs of the mounting plate. As was described above, the openings on the right side of the housing that align with the standoffs are different in the reverse position after the housing has been rotated. In step 1920 the personnel performs the work such as adding components or changing components. In step 1922 the reversed housing is rotated again about the lateral axis to be placed in the regular position or original position. In step 1924 the openings of the housing are aligned with the appropriate standoffs. In step 1926 the head of the fasteners are tightened so that the housing is second between the fastener and the standoffs.

In step 1928 cables are either connected or reconnected. The reconnection may establish further connections to new unit housings that are available through adding a new SWM module.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. An enclosure assembly for an electrical component comprising:
   a mounting plate;
   a plurality of extensions extending from the mounting plate; and
   a cover wall, a plurality of side walls extending from the cover wall forming a partially enclosed housing receiving the electrical component, said cover wall generally parallel to the mounting plate, said cover wall having a plurality of receiving openings aligned with the plurality of extensions, one of the plurality of side walls comprising a plurality of openings or connectors for electrically connecting to the electrical component;
   said electrical component secured to at least one of the cover wall or one of the plurality of side walls;

the cover wall of the housing removably attached to the plurality of extensions using the receiving openings to substantially enclose the electrical component among the cover wall, the side walls and the mounting plate.

2. The enclosure assembly as recited in claim 1 wherein the mounting plate comprises a plurality of studs that couple the plurality of extensions to the mounting plate.

3. The enclosure assembly as recited in claim 1 wherein the mounting plate comprises a plurality of threaded studs that couple the plurality of extensions to the mounting plate.

4. The enclosure assembly as recited in claim 1 further comprising a plurality of fasteners removeably attaching the cover wall to the plurality of extensions, said plurality of fasteners sized to be received within the plurality of receiving openings of the cover wall.

5. The enclosure assembly as recited in claim 1 further comprising a plurality of threaded fasteners removeably attaching the cover wall to the plurality of extensions.

6. The enclosure assembly as recited in claim 1 wherein the plurality of side walls comprise a first side wall comprising the plurality of openings or connectors, a second side wall, a top side wall and a bottom side wall.

7. The enclosure assembly as recited in claim 6 wherein the second side wall, the top side wall and the bottom side wall are disposed perpendicular to the cover wall.

8. The enclosure assembly as recited in claim 6 wherein the second side wall, the top side wall and the bottom side wall comprise vent openings.

9. The enclosure assembly as recited in claim 6 wherein the partially enclosed housing has a first position wherein the mounting plate is spaced part from the cover wall, and the first side wall, the second side wall, the top side wall and the bottom side wall extend from the cover wall toward the mounting plate.

10. The enclosure assembly as recited in claim 9 wherein the partially enclosed housing has a second position wherein the first side wall, the second side wall, the top side wall and the bottom side wall extend from the cover wall away from the mounting plate.

11. The enclosure assembly as recited in claim 10 wherein in the second position the extensions align with the plurality of receiving openings.

12. The enclosure assembly as recited in claim 10 wherein the plurality of receiving openings of the cover wall comprise a first receiving opening and a second receiving opening and the plurality of extensions comprise a first extension and a second extension, wherein the first extension aligns with the first receiving opening in the first position and the second receiving opening in the second position, and the second extension aligns with the second receiving opening in the first position and the first receiving opening in the second position.

13. The enclosure assembly as recited in claim 12 wherein the plurality of receiving openings of the cover wall comprise a third receiving opening, a fourth receiving opening, a fifth receiving opening and sixth receiving opening, wherein a third extension aligns with the third receiving opening in the first position and the fourth extension aligns with the fourth receiving opening in the first position and wherein the third extension aligns with the fifth receiving opening in the second position and the fourth extension aligns with the sixth receiving opening in the second position.

14. The enclosure assembly as recited in claim 10 wherein the plurality of receiving openings of the cover wall comprise a first receiving opening, a second receiving opening, a third receiving opening and a fourth receiving opening, said first receiving opening and the third receiving opening spaced a first distance from a top edge of the cover wall, and the first receiving opening and the second receiving opening spaced the second distance from a right edge the cover wall.

15. The enclosure assembly as recited in claim 14 wherein the second receiving opening and the fourth receiving opening are spaced different distances from a bottom edge of the cover wall.

16. The enclosure assembly as recited in claim 14 wherein the plurality of receiving openings of the cover wall comprise a fifth receiving opening and a sixth receiving opening, wherein the sixth receiving opening and the second receiving opening are the first distance from a bottom edge.

17. The enclosure assembly as recited in claim 16 wherein the fourth receiving opening is the second distance from the top edge and the fifth receiving opening is the second distance from the bottom edge.

18. The enclosure assembly as recited in claim 1 further comprising U-bolts coupled to the mounting plate for securing the mounting plate to a cinder block.

19. A method comprising:
in a first position of a housing comprising a cover wall and a plurality of side walls extending therefrom and wherein at least one of the plurality of side walls comprising a plurality of connectors or openings therein for electrically connecting an electrical component mounted to at least one of the cover wall or one of the plurality of side walls, aligning a first extension, a second extension, a third extension and a fourth extension of a mounting plate with a respective first receiving opening of the cover wall, a second receiving opening of the cover wall, a third receiving opening of the cover wall and a fourth receiving opening of the cover wall of the housing, and substantially enclosing the electrical component among the side walls, cover wall and mounting plate; and
in a second position of the housing, aligning the first extension with the second receiving opening of the cover wall, the second extension with the first receiving opening of the cover wall, the third extension with a fifth receiving opening of the cover wall and the fourth extension with a sixth receiving opening of the cover wall.

20. The method of claim 19 wherein in the first position, positioning a top side wall, bottom side wall, left side wall, and right side wall of the side walls toward the mounting plate, and wherein in the second position, positioning a top side wall, bottom side wall, left side wall, and right side wall away from the mounting plate.

21. The method of claim 19 wherein enclosing an electrical component comprises enclosing television distribution components within the housing.

22. The method of claim 21 further comprising servicing the television distribution components in the second position.

* * * * *